UNITED STATES PATENT OFFICE.

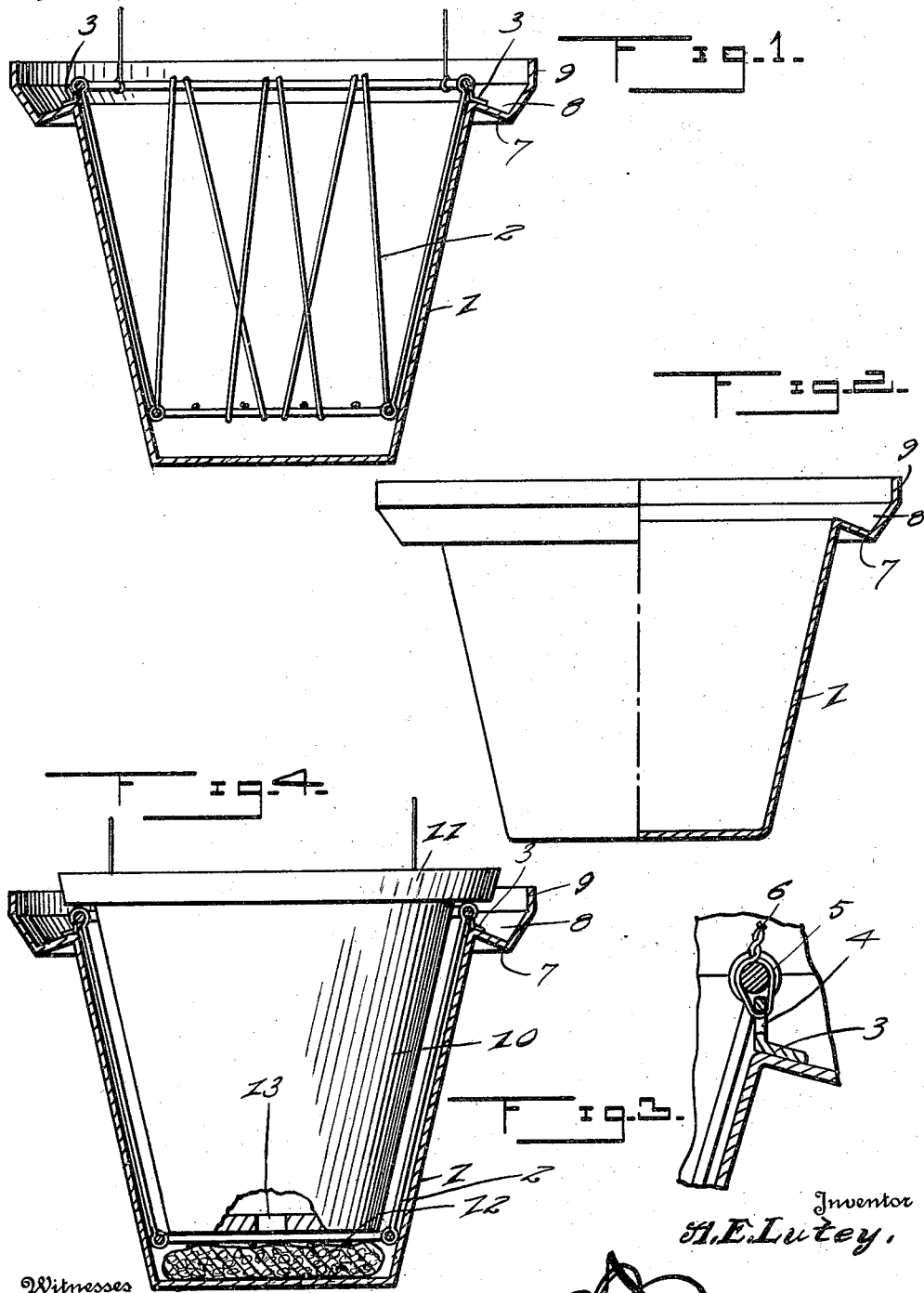

ALBERT EDWARD LUTEY, OF DETROIT, MICHIGAN.

SELF-WATERING JARDINIÈRE FOR HANGING BASKETS.

1,249,973.  Specification of Letters Patent.  Patented Dec. 11, 1917.

Application filed March 17, 1917. Serial No. 155,562.

*To all whom it may concern:*

Be it known that I, ALBERT E. LUTEY, a citizen of the United States, residing at Detroit, in the county of Wayne and State of Michigan, have invented certain new and useful Improvements in Self-Watering Jardinières for Hanging Baskets; and I do hereby declare the following to be a full, clear, and exact description of the invention, such as will enable others skilled in the art to which it appertains to make and use the same.

This invention relates to a self-watering jardinière for hanging baskets and has for one of its objects, the provision of a device of this character, which will readily receive a hanging flower basket for furnishing water or moisture to the plant of the basket.

Another object of this invention is the provision of means for securing the receptacle to the basket, thus permitting the basket to be suspended in the ordinary manner and which will obviate the annoyance of water dripping from the basket after the plant therein has been watered and which will aid in preventing the evaporation of the water or moisture.

A further object of this invention is the provision of the upper edge of the receptacle so formed as to provide a trough for receiving water so that the plant contained within the basket will receive moisture therefrom.

A still further object of this invention is the provision of a self-watering jardinière for hanging baskets, which shall be simple, durable and efficient, and which may be manufactured and sold as at comparatively low cost.

With these and other objects in view, as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which;

Figure 1 is a vertical sectional view of a self-watering jardinière for hanging baskets, constructed in accordance with my invention, Fig. 2 is a side elevation partly in section of the receptacle, Fig. 3 is a detail sectional view illustrating the means for attaching the receptacle to the basket, Fig. 4 is a vertical sectional view partly in elevation illustrating the receptacle applied to a hanging basket, having a flower pot positioned therein.

Referring in detail to the drawing, the numeral 1 indicates a jardinière or receptacle, which is constructed from metal or other material and which may be of any shape. Seated within the receptacle 1 is a wire basket 2, which is of a well known construction and that is principally used for supporting plants by suspending the basket to an object.

The basket 2 is adapted to be filled with moss and earth for the purpose of furnishing the plant with food, and heretofore, it has been customary to set the basket with the plant therein within a pail of water to permit the earth and moss to become saturated with the water and then suspending the basket to an object in the usual manner or it is sometimes customary to pour water on the top of the basket while suspended. The water, which has been absorbed by the moss then drips upon the ground or floor under the basket, making it disagreeable owing to the water dripping therefrom and to overcome this objection. I have provided the receptacle 1, which is provided with L-shaped brackets 3 having apertures in one arm portion thereof, as at 4 to receive tying wires 5, which are adapted to be twisted about the upper edge of the basket 2, as shown at 6 for attaching the basket to the receptacle.

A downwardly and upwardly inclined annular flange 7 is formed upon the upper edge of the receptacle to provide a trough 8 for receiving water. A vertically disposed annular flange 9 is formed upon the upwardly inclined portion of the trough 8 and projects above the upper edge of the basket 2, as shown in Fig. 1, so as to permit water to be readily poured within the trough for furnishing the plant with moisture. The stems and leaves of the plants hang over the trough and absorb moisture therefrom. The earth within the basket may also be saturated with water and the water not absorbed by the earth may run into the receptacle 1 at the bottom and later be absorbed by the earth as the same becomes dry from evaporation or used up by the plant.

When not desiring to place the earth and plant within the basket 2, the plant and earth may be placed in an ordinary flower pot 10, as shown in Fig. 4, permitting the flange 11 of the flower pot to rest upon the upper edge of the basket 2. In order to furnish the plant contained within the flower pot 10 with moisture from the receptacle, a sponge 12 is positioned within the bottom of the receptacle and adapted to receive moisture or absorb the water within the receptacle and furnish it to the plant through the opening 13 of the flower pot.

From the foregoing description taken in connection with the accompanying drawing it will be noted that the applicant has provided a device which may be readily applied to a well known construction of hanging baskets for flowers, and which will prevent water dripping from the basket to fall upon the floor or ground, and which will retain said water so that the plant contained within the basket may absorb and utilize the same at its will.

While I have shown and described the preferred embodiment of my invention, it will be understood that minor changes in construction, combination and arrangement of parts may be made without departing from the spirit and scope of the invention as claimed.

Having thus described my invention, what I claim is:

1. A device of the character set forth comprising a receptacle adapted to receive water and a flower basket, brackets formed upon the upper edge of the receptacle and having apertures, tying wires extending through the apertures and twisted about the basket to secure the receptacle to the basket.

2. A device of the character set forth comprising a receptacle adapted to receive water and a flower basket, means for connecting the receptacle to the basket, and a trough formed upon the upper edge of the receptacle and adapted to contain water for furnishing the plant within the basket with moisture by the stems and leaves thereof overhanging the trough.

3. A device of the character set forth comprising a receptacle, a flower basket located within said receptacle, means for securing the receptacle to the basket, a trough formed upon the upper edge of the receptacle and adapted to receive water, said basket adapted to receive a flower pot containing a plant, and said basket having its bottom spaced from the bottom of the receptacle, and a sponge interposed between the bottom of the flower basket and the receptacle to absorb water from the receptacle to furnish the plant within the flower pot with moisture.

In testimony whereof I affix my signature in presence of two witnesses.

ALBERT EDWARD LUTEY.

Witnesses:
 LEWIS C. RIEFSTAHL, Jr.,
 JOHN PROUDFOOT.

Copies of this patent may be obtained for five cents each, by addressing the "Commissioner of Patents, Washington, D. C."